United States Patent
Hussain et al.

(10) Patent No.: US 6,380,942 B1
(45) Date of Patent: *Apr. 30, 2002

(54) PACKETIZED COMMAND INTERFACE TO A GRAPHICS PROCESSOR

(75) Inventors: Zahid S. Hussain, San Carlos; Timothy J. Millet, Palo Alto, both of CA (US)

(73) Assignee: Silicon Graphics, Incorporated, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/549,156

(22) Filed: Apr. 13, 2000

Related U.S. Application Data (63) Continuation of application No. 08/967,085, filed on Nov. 10, 1997, now Pat. No. 6,075,546.

(51) Int. Cl.$^7$ .............................................. G06F 15/00
(52) U.S. Cl. .................. 345/522; 345/556; 345/564; 345/530; 345/553
(58) Field of Search ............................... 345/522, 512, 345/514, 515, 507–509, 542, 556, 564, 530, 536, 553, 541

(56) References Cited

U.S. PATENT DOCUMENTS

| | | | |
|---|---|---|---|
| 5,299,309 A | * 3/1994 | Kuo et al. ................. | 345/512 |
| 5,664,104 A | * 9/1997 | Shinjo et al. .............. | 709/224 |
| 5,664,163 A | * 9/1997 | Yutaka et al. ............. | 345/522 |
| 5,706,478 A | * 1/1998 | Dye .......................... | 345/503 |
| 5,832,236 A | * 11/1998 | Lee .......................... | 709/249 |
| 5,854,638 A | * 12/1998 | Tung ......................... | 345/512 |
| 6,075,546 A | * 6/2000 | Hussain et al. ............ | 345/522 |
| 6,104,417 A | * 8/2000 | Nielsen et al. ............. | 345/521 |

* cited by examiner

Primary Examiner—Raymond J. Bayerl
Assistant Examiner—Sy D. Luu
(74) Attorney, Agent, or Firm—Squire, Sanders & Dempsey, L.L.P.

(57) ABSTRACT

A method and apparatus for transferring commands to a graphics processor is provided. The method and apparatus are intended for use in a host computer system having a memory that is addressable by a host processor and a graphics processor. One or more queues of packet descriptors are maintained in the memory of the host computer system. Each packet descriptor includes a pointer to a region of memory known as a packet buffer. Each packet descriptor also includes a ready variable. To pass commands to the graphics processor, a graphics process selects a packet buffer. The packet buffer must have a ready variable that is set to the value false. After selection of the appropriate packet descriptor, the graphics process writes the desired commands into the packet descriptor associated with the selected packet descriptor. The graphics process then sets the ready variable included in the selected packet descriptor to true. The graphics processor traverses the queues of packet descriptors. For each packet descriptor encountered, the graphics processor tests the included ready variable. If the ready variable is set to true, the graphics processor executes the commands included in the associated packet buffer. After completing these commands, the graphics processor sets the ready variable to false. In this way, the present invention allows the host and graphics processors to execute in parallel and allows commands to be transferred to the graphics processor without the use of a system call.

5 Claims, 4 Drawing Sheets

PACKETIZED COMMAND INTERFACE TO A GRAPHICS PROCESSOR

PRIORITY REFERENCE TO PRIOR APPLICATION

This application is a continuation of claims priority to and incorporates by reference parent application U.S. patent application Ser. No. 08/967,085, now U.S. Pat. No. 6,075, 546, entitled "Packetized Command Interface To Graphics Processor" of Zahid S. Hussain et al. filed Nov. 10, 1997.

RELATED APPLICATIONS

The following co-pending patent application is related to the subject application and is herein incorporated by reference:

U.S. application Ser. No. 08/713,779, filed Sept. 15, 1996, entitled "A Unified Memory Computer Architecture With Dynamic Graphics Memory Allocation" of Michael J. K. Nielsen and Zahid S. Hussain.

FIELD OF THE INVENTION

The present invention relates generally to systems for computer graphics. More specifically, the present invention includes a method for passing commands to a graphics processor.

BACKGROUND OF THE INVENTION

Modern computers (and related devices) typically produce graphical output using a sequence of tasks known as a graphics pipeline. These tasks start with a mathematical representation of an image to be produced and finish with pixel data suitable for display on a video screen or other output device. The tasks that perform this translation (i.e., the tasks included in a graphics pipeline) may be performed entirely by the host processor or processors included in a host computer system. Another common arrangement is to split the graphics pipeline so that the host processor performs only an initial subset of the pipeline tasks. The remaining tasks are then performed by a specialized graphics processor. Splitting the graphics pipeline often results in increased graphics throughput (due to the specialized abilities of the graphics processor). Splitting also generally results in increased throughput for the host processor (due to the decreased demands placed on the host processor).

In architectures where graphics processors are used, the initial subset of pipeline tasks are typically performed as part of user-mode, non-privileged, execution of the host processor. This means that these tasks may be included within a user process or application. It also means that these tasks may be replicated within a series of processes. Effectively, the graphics pipeline is modified so that a group of initial pipeline segments are all multiplexed to feed the graphics processor.

Use of a graphics processor also means that the output of the initial pipeline segment, or segments, must be transferred to become the input of the graphics processor. In an ideal architecture, this transfer would be accomplished at little or no cost. Unfortunately, in traditional architectures, access to the graphics processor cannot be accomplished as part of user-mode execution of the host processor. Instead, a user process or application that desires to send information to the host processor must do so as part of a system call. The system call invokes the operating system of the host processor and the operating system performs the transfer on behalf of the user process. The context switch from user-mode to privileged mode is time consuming and decreases the efficiency of the graphics process.

In addition to being time consuming, the use of a system call also tends to serialize the operation of the host and graphics processor. This follows because the use of a system call forces the operating system to act as a sort of arbitrator between the host and graphics processors. If the graphics processor finishes its current tasks, it is forced to wait until the operating system decides to transfer more work to the graphics processor. If the operating system is attending to other duties, available work may have to wait to be transferred. Thus, the host and graphics processors exhibit an unnecessary degree of interdependence and potential parallism remains un-exploited.

SUMMARY OF THE INVENTION

The present invention includes a method and apparatus for efficiently transferring graphics commands to a graphics processor. A representative environment for the present invention includes a host computer system having one or more host processors and a graphics processor. The host computer also includes a system memory. The system memory is addressable by the host and graphics processors.

The host computer system provides an environment for the production of computer graphics. Within this environment, graphics processes are associated with rendering contexts. Each rendering context provides a virtual interface to the graphics processor. As part of this interface, each rendering context includes one or more rendering packets. Each rendering packet is a data structure that includes a packet buffer and an associated packet descriptor. A packet buffer is a memory region into which graphics commands may be stored. The size of each packet buffer (and thus, the number of graphics commands that may be stored in the packet buffer) may be varied to suit the needs of a particular embodiment of the present invention. A packet descriptor is a compact data structure that, for the described embodiment, includes a ready variable, an interrupt variable, a size variable and a next pointer. The size variable of a rendering packet is initialized to contain the number of memory words included in the packet buffer of the rendering packet. Upon initialization, the ready variable and the interrupt variable are both set to false.

The next pointer is used to form linked lists, or queues, of rendering packets. For one arrangement, the rendering packets in each graphics context are linked into one or more circular queues. For another arrangement, all of the rendering packets included in the host computer system are linked into a circular queue. Still other arrangements are practical and advantageous for particular environments and applications.

To send commands to the graphics processor, a graphics process first selects a rendering packet. The ready variable included in the selected rendering packet must be set to a value of false. If the selected rendering packet does not have a false ready variable, the graphics process either waits or performs other processing. When the graphics process determines that the ready variable of the selected rendering packet is false, the graphics process batches graphics commands to the packet buffer. The graphics process then sets the ready variable included in the selected rendering packet to a value of true. Setting the ready variable to true indicates that the rendering packet is ready for processing by the graphics processor.

The graphics processor traverses the queues of rendering packets. At each rendering packet, the graphics processor polls the state of the ready variable. When this variable is set to true, the graphics processor executes each of the commands included in the packet buffer of the rendering packet. Once execution of these commands is complete, the graphics processor sets the ready variable to false. If the interrupt variable is set to true, the graphics processor then sends an interrupt signal to the host processor.

As may be appreciated, the present invention provides a method and apparatus that allow the host and graphics processors to function in a relatively independent, asynchronous manner. Additionally, transfer of commands to the graphics processor occurs as part of user-mode execution of the host computer system without the need for a system call.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Figure 1:
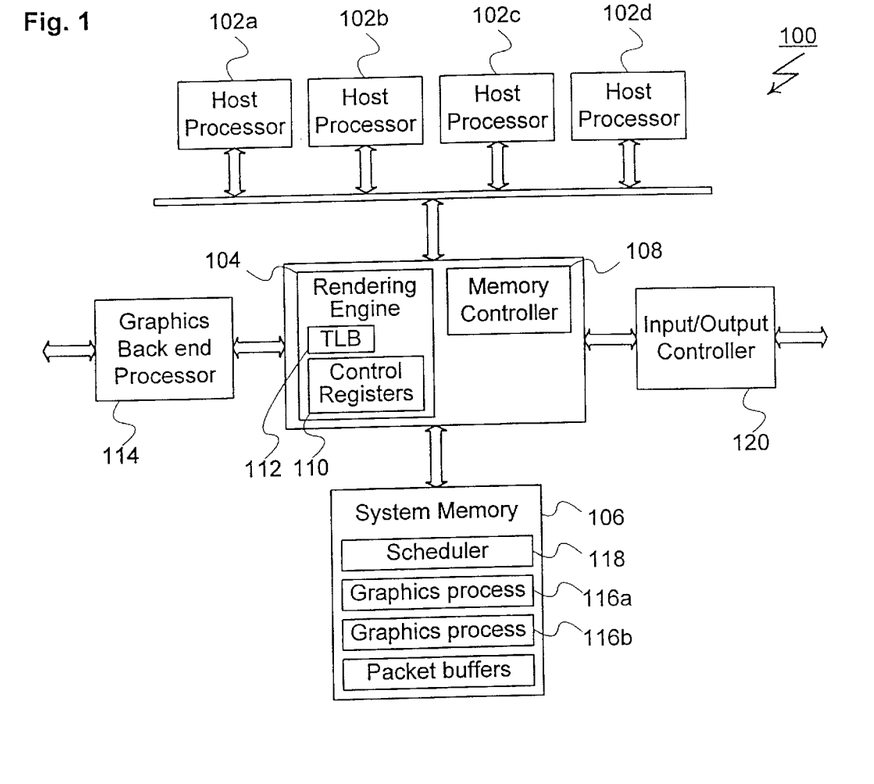
FIG. 1 is a block diagram of a host computer system shown as an exemplar environment for a preferred embodiment of the present invention.

In FIG. 1, a host computer system 100 is shown as a representative environment for the present invention. Structurally, host computer system 100 includes a host processor, or host processors, of which host processors 102a through 102d are representative. Host processors 102 represent a wide range of commercially available or proprietary types. Host computer system 100 also includes a rendering engine 104, a system memory 106 and a memory controller 108.

Memory controller 108 provides simultaneous access to system memory 106, to host processors 102 and rendering engine 104. For the exemplary implementation of FIG. 1, memory controller 108 and rendering engine 104 are shown as sub-components of a combined memory controller/rendering engine subsystem. This grouping allows memory controller 108 and rendering engine 104 to be implemented as a single integrated circuit. This combined implementation is entirely representative in nature. Thus, these components may be implemented separately, or combined with still more components without departing in any way from the present invention.

Rendering engine 104 includes a control register file 1 10 and a translation lookaside buffer (TLB) 112. Host processors 102 monitor and control operation of rendering engine 104 by reading and writing control and status registers included in control register file 110. Rendering engine 104 uses TLB 112 to perform virtual to physical address translation. This allows host processors 102 and rendering engine 104 to consistently address system memory 106. In particular, TLB 112 allows host processors 102 and rendering engine 104 to use the same virtual addresses to refer to the same locations in system memory 106.

Host computer system 100 also includes a graphics back end processor 114. Together, host processors 102, rendering engine 104 and graphics back end processor 114 cooperate to perform all of the tasks included in a graphics pipeline. The pipeline functions performed by each of these components (i.e., host processors 102, rendering engine 104 and graphics back end processor 114) is largely dependent on the overall graphics architecture employed by host computer system 100. For the purposes of description, however, it may be assumed that graphics back end processor 114 functions as a frame buffer converting the digital graphics output of rendering engine 104 to a form suitable for display or other output. Host processors 102 and rendering engine 104 split the remaining tasks of the graphics pipeline. Preferably, rendering engine 104 will be configured to perform the majority of these tasks, freeing host processors 102 to perform other duties. For the purposes of description, rendering engine 104 and graphics back end processor 114 may be described as a graphics processor.

Graphics processes, represented by graphics processes 116a and 116b, use the graphics processor provided by rendering engine 104 and graphics back end processor 114. Host computer system 100 provides support for concurrent execution of an arbitrary number of these graphics processes 116. Scheduler process 118 apportions the operation of rendering engine 104 and graphics back end processor 114 between the competing demands created by graphics processes 116. Operation of scheduler 118 will be discussed in more detail in later sections of this document.

Host computer system 100 includes an input/output controller 120. Input/output controller 120 functions as a channel allowing host computer system 100 to be connected to a wide range of input/output devices, such as disk drives, non-volatile storage systems, keyboards, modems, network adapters, and printers.

As mentioned, host computer system 100 is shown as a representative environment for the present invention. The structural details of this representative environment are more fully discussed in co-pending, commonly owned U.S. application Ser. No. 08/713,779, filed Sept. 15, 1996, entitled "A Unified Memory Computer Architecture With Dynamic Graphics Memory Allocation" of Michael J. K. Nielsen and Zahid S. Hussain. It should be appreciated, however, that the present invention is equally applicable to a range of computer systems and related devices and is not limited to the representative environment of host computer system 100.

Host computer system 100 provides an environment for the production of computer graphics. Within this environment, graphics processes 116 create and manipulate graphics entities such as windows or pixmaps. To create a graphics entity, a graphics process 116 first creates an associated rendering context. The rendering context is a data structure that provides a virtual interface to rendering engine 104. The creating graphics process 116 then uses the virtual interface provided by the rendering context to create and manipulate the associated graphics entity.

Figure 2:
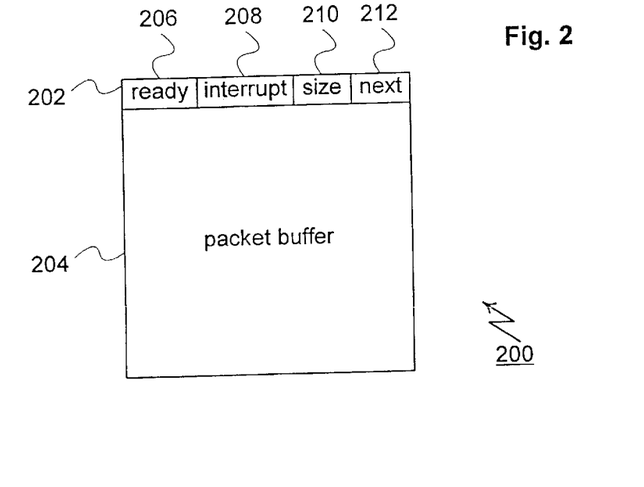
FIG. 2 is a block diagram of a rendering packet data structure in accordance with a preferred embodiment of the present invention.

Each rendering context includes one or more rendering packets of the type shown in FIG. 2 and generally designated 200. Rendering packet 200 is a data structure that is included in system memory 106. Rendering packet 200 may be dynamically created or statically assigned. Structurally, rendering packet 200 includes a packet descriptor 202 and a packet buffer 204. Packet buffer 204 is a contiguous memory region into which graphics commands may be stored. The size of packet buffer 204 is intended to vary between different instances of rendering packet 200. This allows different packet buffers 204 to be constructed to store few, or many, graphics commands.

Packet descriptor 202 includes a ready variable 206, an interrupt variable 208, a size variable 210 and a next pointer 212. Preferably, packet descriptor 202 is a bit-field having thirty-two bits. This bit field includes ready variable 206, interrupt variable 208, size variable 210 and next pointer 212. Ready variable 206 and interrupt variable 208 are single-bit boolean variables and take on the values of true and false. Upon initialization, ready variable 206 and interrupt variable 208 are set to false. For the described embodiment, size variable 210 and next pointer 212 each occupy fifteen bits within packet descriptor 202. Size variable 210 is used to record the size of packet buffer 204. Depending on the particular implementation, the size of packet buffer 204 (and thus, the value stored in size variable 210) may be calculated in terms of memory words or other appropriate units.

Next pointer 212 is used to create linked lists, or queues, of rendering packets 200. This is shown more clearly in FIG. 3 where next pointer 212 has been used to construct a circular queue of rendering packets 200a, 200b and 200c and a linear queue of rendering packets 200d and 200e. This linkage is accomplished by initializing the next pointer 212 of a previous rendering packet 200 to be equal to the memory address of a subsequent rendering packet 200. For the described embodiment, next pointer 212 includes fifteen bits. As a result, for many configurations of system memory 106, next pointer 212 will be limited to addressing a subset of the possible addressing range. For the described embodiment of host computer system 100, control registers 110 include a base address register. The value included in the base register (which may be set by the host processors 102) defines the segment within system memory 106 where rendering packets 200 will be located. The value included in next pointer 212 is then added to the value included in the base address register to locate a particular rendering packet 200.

Figure 3:
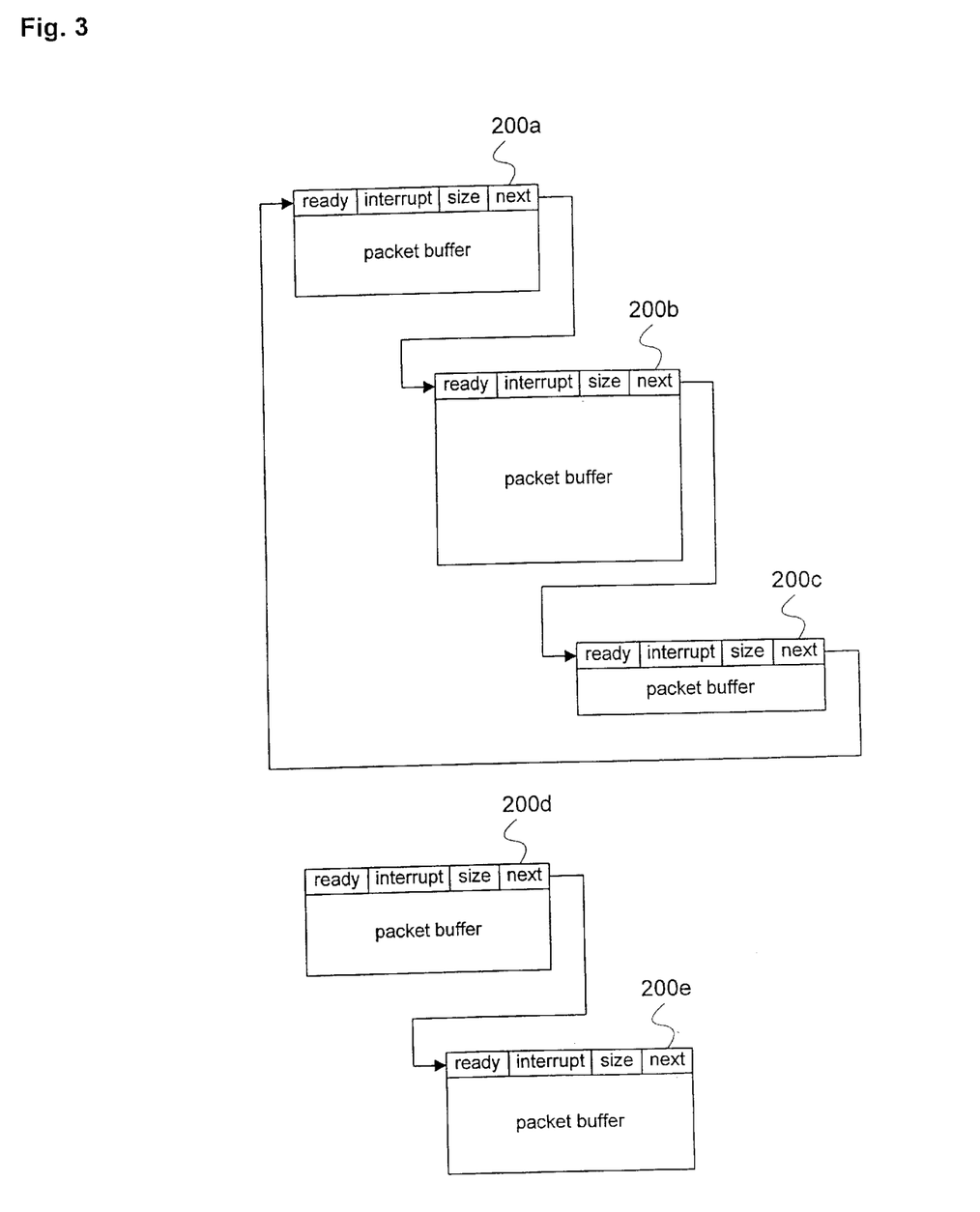
FIG. 3 is a block diagram showing two queues of rendering packets in accordance with a preferred embodiment of the present invention.

Host computer system 100 may include any combination of the circular and linear queues shown in FIG. 3. Host computer system 100 may also include individual, unlinked rendering packets 200. In general, these queues and individual rendering packets 200 may be organized in a number of different ways. For one organization, rendering packets 200 are linked so that each rendering context includes a single circular queue of rendering packets 200. This organization provides an efficient mechanism that provides sequential access to each of the rendering packets 200 included in a rendering context.

Alternatively, rendering packets 200 may be linked so that each rendering context includes a combination of zero or more circular queues, linear queues, and unlinked rendering packets 200. This organization allows the rendering packets 200 included within a rendering context to be logically partitioned. For example, a rendering context may include separate queue structures for foreground and background portions of a window. Access to all of the rendering packets 200 include within a rendering context may not, however, be as efficient as in the case of a single queue per rendering context.

As another alternative, the rendering packets 200 included in host computer system 100 may be linked into one or more global queues. This organization provides an efficient mechanism that provides sequential access to each of the rendering packets 200 included in host computer system 100. Access to rendering packets 200 on a rendering context by rendering context basis is not, however, as easily accomplished.

The preceding paragraphs describe three different organizations for rendering packets 200 in host computer system 100. Still other organizations may be appropriate to other embodiments of the present invention. For simplicity, except as otherwise noted, the following description assumes the use of an organization where each rendering context includes a single circular queue of one or more rendering packets 200.

Figure 4:
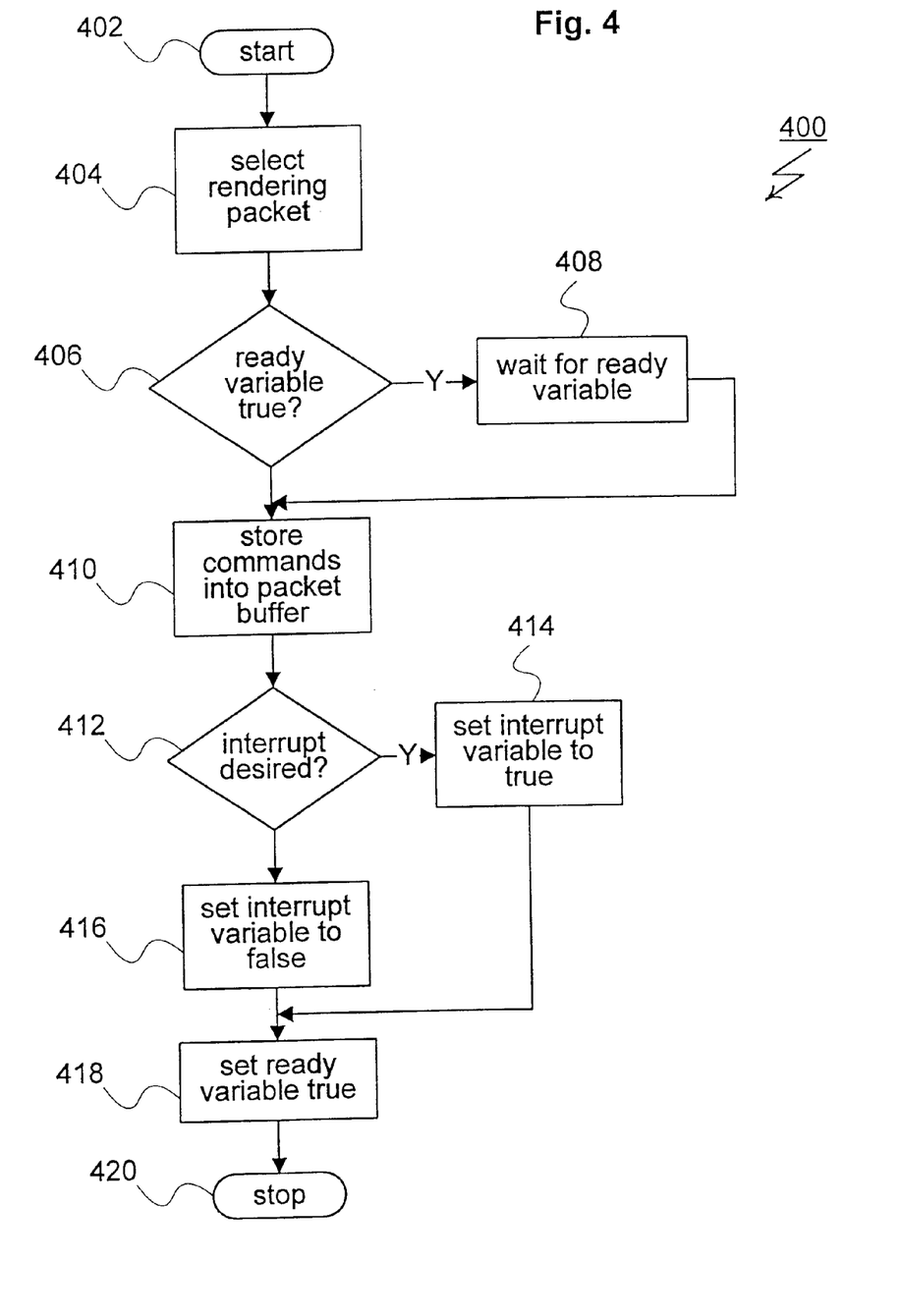
FIG. 4 is a flowchart showing the steps performed by the host processor to transfer information from the host processor to the graphics processor in accordance with a preferred embodiment of the present invention.

Graphics processes 116 use rendering packets 200 to transfer graphics commands to rendering engine 104. This transfer requires both a sending method (executed by the graphics process 116 using host processor 102) and a receiving method (executed by the rendering engine 104). A preferred embodiment of the sending method is shown in FIG. 4 and generally designated 400. Method 400 begins with start placeholder 402 representing invocation of method 400. For the purposes of illustration, it may be assumed that the sending graphics process 116 has already created a rendering context that includes the circular queue of rendering packets 200 shown in FIG. 3.

In step 404, the sending graphics process 116 selects a rendering packet 200. For the purposes of the present invention, it is preferable that the rendering packets 200 included within a queue be processed in order. Thus, for the circular queue of FIG. 3, rendering packet 200a would be selected initially, followed by rendering packet 200b and rendering packet 200c.

The selected rendering packet 200 must have a ready variable 206 set to the value of false. This indicates that the selected rendering packet 200 is not waiting for processing or being processed by rendering engine 104. In step 406 the sending graphics process 116 tests the state of the ready variable 206 included in the selected rendering packet 200. If the ready variable 206 has a value of true, execution of method 400 continues at step 408. In step 408, the sending graphics process 116 waits for the ready variable 206 to become false. During the time spent waiting, the graphics process 116 may perform other work. Alternately, the graphics process 116 may voluntarily enter a sleeping state until ready variable 206 becomes false.

In step 410, the sending graphics process 116 transfers graphics commands into the packet buffer 204 of the selected rendering packet 200. To perform this transfer, the sending graphics process 116 writes the graphics commands to be transferred into successive locations of the packet buffer 204 included in the selected rendering packet 200. In this way, the packet buffer 204 included in the selected rendering packet 200 becomes an array of graphics commands.

In some cases, it is desirable for rendering engine 104 to interrupt host processor 102 when rendering engine 104 has completed processing a particular rendering packet 200. For example, generation of an interrupt by rendering engine 104 provides a convenient method for waking graphics processes 116 that have entered a sleep state waiting for ready variable 206 to become false (see step 408). Where an interrupt of this type is desirable, step 412 causes execution of method 400 to continue at step 414. In step 414, the sending graphics process 116 sets the interrupt variable 208 included in the selected rendering packet 200 to the value true. Where no interrupt is desired, execution of method 400 continues at step 416. In step 416, the graphics process 116 sets the interrupt variable 208 included in the selected rendering packet 200 to the value false.

In step 418, the sending graphics process 116 sets the ready variable 206 included in the selected rendering packet 200 to the value true. This indicates that the selected rendering packet 200 is now ready for processing by rendering engine 104. Method 400 ends with stop placeholder 420 representing completion of method 400. The sending graphics process 116 may repeat method 400 for successive rendering packets 200 included with the circular queue of FIG. 3. Alternatively, the same method may be used by the sending graphics process 116 for the rendering packets 200 included within the linear queue of FIG. 3, or for individual, unlinked, rendering packets 200.

At any given time, there may be an arbitrary number of graphics processes 116 invoking separate instances of method 400. There may also be an arbitrary number of rendering packets 200 that have been processed by method 400. These rendering packets 200 have ready variables 206 set to the value true and are ready for processing by rendering engine 104. Scheduler process 118 is responsible for selecting the ordering in which rendering engine 104 will process the rendering packet 200 included in host computer system 100. For the purposes of the present invention, scheduler 118 may use a wide range of methods to perform this selection. For one method, scheduling is performed on a round-robin, rendering context by rendering context basis. For this type of scheduling method, scheduler process 118 causes rendering engine 104 to sequence through the rendering contexts included in host computer system 100. For each rendering context, rendering engine 104 processes zero or more included rendering packets 200.

Round-robin scheduling may be modified using a number of fair scheduling and priority methods. For one type of fair scheduling, the round-robin method is modified so that rendering engine 104 limits the amount of time spent processing each successive rendering context. In this type of method, rendering engine 104 suspends processing the rendering packets 200 included in each rendering context when a predetermined time limit is reached. This processing is resumed when the rendering context is subsequently reselected by the round-robin process.

For priority based scheduling, rendering contexts are selected by scheduler process 118 based on numerical priorities. These priorities may be may be fixed or dynamically calculated. Dynamically calculated priorities can be modified to reflect the amount of time required to process the rendering packets 200 included in each respective rendering context. This allows the scheduling process to be biased in favor of shorter or more time consuming rendering contexts. Dynamic priorities can also be modified to reflect the time interval since a rendering context was last selected by scheduler process 118. In this way, rendering contexts that have waited longer for processing may be accorded a higher scheduling priority.

Scheduler process 118 can also use a wide range of other queuing and scheduling methods. Using one of these methods, scheduler process 118 will periodically select one or more rendering packets 200 for processing by rendering engine 104. When this occurs, scheduler process 118 transfers information to rendering engine 104. The transferred information identifies the selected rendering packets 200 (where a queue of rendering packets 200 has been selected, the address of the first rendering packet 200 is transferred) and informs rendering engine 104 that a context switch is required. Depending on the particular implementation of host computer system 100, this information may be transferred using a range of different techniques. For the representative environment of host computer system 100, scheduler process 118 writes the required information, including the address of a selected rendering packet 200, into control registers 110.

Figure 5:
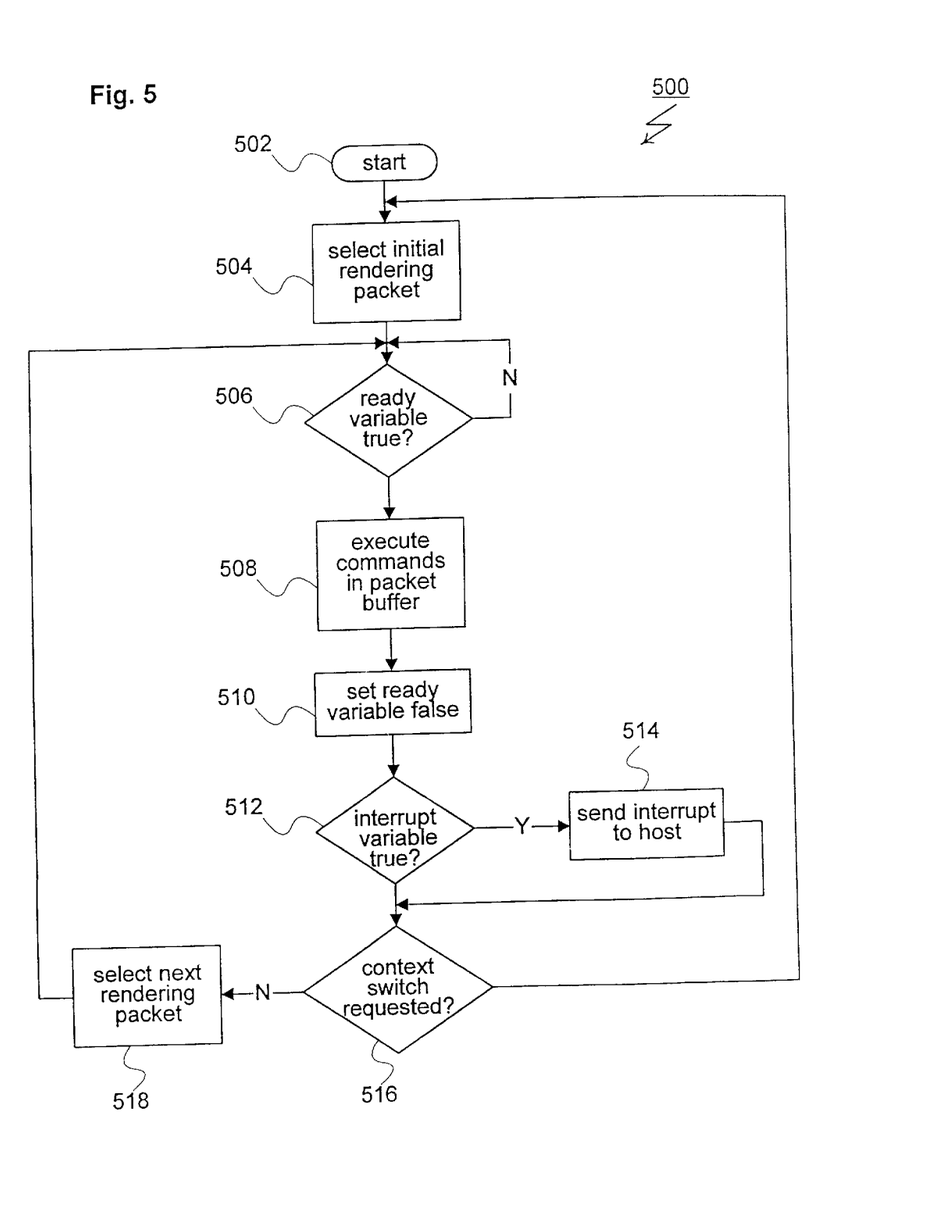
FIG. 5 is a flowchart showing the steps performed by the graphics processor to receive information from the host processor in accordance with a preferred embodiment of the present invention.

As mentioned, a preferred embodiment of the present invention also includes a receiving method executed by the rendering engine 104. An embodiment of the receiving method is shown in FIG. 5 and generally designated 500. Method 500 begins with start placeholder 502 representing invocation of method 500. For the purposes of illustration, it may be assumed that scheduler process 118 has selected the circular queue of rendering packets 200 shown in FIG. 3 for processing by rendering engine 104. Thus, it may be assumed that information including the address of the rendering packet 200a has been transferred to control registers 110.

In step 504 rendering engine 104 uses the information included in control registers 110 to select an initial rendering packet 200. For the example being described, the initial rendering packet 200 selected in step 504 is rendering packet 200a. In step 506 rendering engine 104 tests the state of the ready variable 206 included in the selected rendering packet 200. In the case that the tested ready variable 206 has a value of false, step 506 is repeated. In this way, rendering engine 104 polls the state of ready variable 206 until ready variable 206 has a value of true.

When the ready variable 206 included in the selected rendering packet 200 is determined to have a value of true, execution of method 500 continues at step 508. In step 508, rendering engine 104 executes the graphics commands included in the packet buffer 204 of the selected rendering packet 200. To perform this execution, rendering engine 104 will typically perform a direct memory access (DMA) transfer of the contents of the packet buffer 204 to a buffer included in rendering engine 104. Alternately, rendering engine 104 may be configured to execute these commands directly from the packet buffer 204 of the selected rendering packet 200.

After completing the commands included in the packet buffer 204 of the selected rendering packet 200, execution of method 500 resumes at step 510. In step 510, rendering engine 104 sets the state of the ready variable 206 of the selected rendering packet 200 to false. This frees the selected rendering packet 200 for reuse by the sending graphics process 116.

In step 512, rendering engine 104 tests the state of the interrupt variable 208 of the selected rendering packet 200. In the case where interrupt variable 208 has a value of true, execution continues at step 514. In step 514, rendering engine 104 sends an interrupt to host processor 102 indicating that rendering engine 104 has completed processing the selected rendering packet 200.

Execution of method 500 continues at step 516. In step 516 rendering engine 104 determines if scheduler process 118 has requested that rendering engine 104 perform a context switch. To make this determination, rendering engine 104 examines the state of control registers 110. If scheduler process 118 has transferred information to control registers 110 indicating that a context switch is desired, execution of method 500 returns to step 504. In step 504 the initial rendering packet 200 of the new context is selected and a new invocation of method 500 begins. In the alternative (i.e., where no context switch has been requested), execution of method 500 continues at step 518. In step 518, rendering engine uses the next pointer 212 included in the selected rendering packet 200 to select a next rendering packet 200. Execution of method 500 then continues at step 506 for processing of the next rendering packet 200.

In the preceding descriptions of scheduler 120 and method 500 it may be noted that rendering engine 104 periodically performs contexts switches. Each context switch occurs when rendering engine 104 discontinues processing the rendering packets 200 included in a first rendering context and begins to process the rendering packets 200 included in a second rendering context. In general, each time rendering engine 104 performs a context switch, there may be some amount of information, or context, that needs to be saved. This context information reflects the internal state of rendering engine 104 that has resulted from processing the rendering packets 200 included in the first rendering context (i.e., the queue of rendering packets 200 that are being processed at the time of the context switch).

Context information saved when a context switch deactivates a rendering context must be restored when a later context switch reactivates the same rendering context. In general, there may be several methods for performing the context information saves and restores required during context switches. Preferably, however, the present invention uses the same rendering packet 200 interface that is generally used to transfer graphics commands to rendering engine 104. More specifically, for the save/restore method of the present inventions save/restore rendering packets 200 are allocated within system memory 106. The save/restore rendering packets 200 may be allocated dynamically, on an as-needed basis, or statically. For the organization where a single queue of rendering packets 200 is included in each rendering context, it is practical to assign a single save/restore rendering packet 200 to each rendering context.

During a context switch from a rendering context, rendering engine 104 writes a series of commands to one of these save/restore rendering packets 200. These commands describe the internal state of rendering engine 104. Rendering engine 104 then arranges for the save/restore packet 200 to be processed immediately following a later context switch that reactivates the same rendering context. Preferably, rendering engine 104 accomplishes this by linking the save/restore rendering packet 200 into the queue of rendering packets 200 included in the rendering context being deactivated. The save/restore rendering packet 200 is linked into a position so that the save/restore rendering packet 200 becomes the first rendering packet 200 that will be processed when a later context switch reactivates the queue of rendering packets 200. At that time, rendering engine 104 reads the commands stored in the save/restore rendering packet 200. Reading these commands restores the internal state of rendering engine 104. In this way, the present invention provides a method for saving and restoring the internal state of rendering engine 104 that operates within the same interface that is generally used to transfer graphics commands to rendering engine 104.

For some embodiments of rendering engine 104, processes rendering packets 200 occurs atomically. For these cases, rendering engine 104 processes all of the graphics commands included in the packet buffer 204 of a rendering packet 200 without interruption. Only after these graphics commands have been processed does rendering engine determine if a context switch is required. Thus, context switches are performed on a between rendering packet 200 basis. This case is described, implicitly, in regard to method 500. It should be appreciated, however, that, by appropriate modification, rendering engine 104 may be configured to provide context switching during the processing of rendering packets 200. In these cases, rendering engine 104 is configured to determine if a context switch is required on a between graphics command basis. Rendering engine 104 is also configured to save and restore the offset into the packet buffer of the last (or next) graphics command to be executed as part of the context switch process.

For some embodiments of the present invention, rendering engine 104 is configured to allow inclusion of flow control commands within the packet buffers 204 of rendering packets 200. Flow control commands allow rendering engine 104 to selectively branch or jump during execution of the graphics commands included rendering packets 200. Flow control commands may provide intra-rendering packet 200 branching (i.e., branching between different locations included in the packet buffer 204 of a single rendering packet 200). Alternately, rendering engine 104 may be configured to include inter-rendering packet 200 branching (i.e., between different rendering packets 200).

Branch and link flow control instructions are a form of inter-rendering packet 200 branching. A branch and link instruction takes, as an argument, the address of a target rendering packet 200. The target rendering packet 200 may be an individual rendering packet 200 or may be part of a queue structure. Execution of the branch and link instruction causes rendering engine 104 to generate a return address. The return address is the offset in system memory 106 of the command that follows the branch and link instruction. Rendering engine 104 then saves the generated return address. Preferably, this is accomplished by pushing the generated return address onto a per-rendering context call stack. These call stacks may be maintained in system memory 106 on a per-rendering context basis. After generating and saving the return address, rendering engine 104 begins execution of the rendering packet 200 included as the target of the branch and link instruction.

Execution of the target rendering packet 200 proceeds according to the steps shown in FIG. 5, until a return command is encountered. Upon encountering a return command, rendering engine retrieves the return address from the top of the per-rendering context call stack. Rendering engine 104 then jumps to continue execution at the return address (i.e., the command that followed the original branch and link command). In this way, the present invention provides a method and apparatus that allows rendering packets 200 and queues of rendering packets 200 to be called as subroutines. For example, a rendering packet 200 or queue of rendering packets 200 that produce the background portion of a window may be called as a subroutine. This is especially advantageous in cases where the background portion of a window remains relatively constant while the foreground changes.

As may be appreciated, use of the rendering packet 200 data structure, in combination with the steps described with regard to methods 400 and 500 allows the host processors 102 and rendering engine 104 to function in a relatively independent and asynchronous manner. Additionally, transfer of commands to rendering engine 104 occurs as part of user-mode execution of the host computer system without the need for a system call.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for transferring graphics commands in a host computer system having a first processor, a second processor and a memory addressable by the first and second processors, the method including the steps, performed by the first processor, of:

selecting a rendering packet, the rendering packet including a packet buffer, an interrupt variable and a ready variable;

storing one or more graphics commands into the packet buffer of the selected rendering packet; and     setting the ready variable included in the selected rendering packet to a value of true, thereby enabling the second processor to asynchronously access more than one rendering packet.

2. A method as recited in claim 1 wherein the interrupt variable indicates whether an interrupt of the first processor is desirable.

3. A system for transferring graphics commands in a host computer system having a first processor, a second processor and a memory addressable by the first and second processors, the system including:

means for causing the first processor to select a rendering context for processing based on a scheduling order;

means for causing the first processor to select a rendering packet of the rendering context, the rendering packet including a packet buffer, an interrupt variable and a ready variable;

means for causing the first processor to store one or more graphics commands into the packet buffer included in the selected rendering packet; and     means for causing the first processor to set the ready variable included in the selected rendering packet to a value of true, thereby enabling the second processor to asynchronously access more than one rendering packet.

4. A method for transferring graphics commands in a host computer system having a first processor, a second processor and a host computer system memory addressable by the first and second processors, the method including the steps, performed by the first processor, of:

selecting a rendering packet located in the system memory, the rendering packet including a packet buffer, an interrupt variable and a ready variable;

storing one or more graphics commands into the packet buffer of the selected rendering packet; and     setting the ready variable included in the selected rendering packet to a value of true.

5. A system for transferring graphics commands in a host computer system having a first processor, a second processor and a host computer system memory addressable by the first and second processors, the system including:

means for causing the first processor to select a rendering context for processing based on a scheduling order;

means for causing the first processor to select a rendering packet of the rendering context, the rendering packet including a packet buffer located in the system memory, an interrupt variable and a ready variable;

means for causing the first processor to store one or more graphics commands into the packet buffer included in the selected rendering packet; and     means for causing the first processor to set the ready variable included in the selected rendering packet to a value of true.

\* \* \* \* \*

UNITED STATES PATENT AND TRADEMARK OFFICE
CERTIFICATE OF CORRECTION

PATENT NO.    : 6,380,942 B1
DATED         : April 30, 2002
INVENTOR(S)   : Hussain et al.

It is certified that error appears in the above-identified patent and that said Letters Patent is hereby corrected as shown below:

Column 1,
Line 6, delete "is a continuation of".
Line 10, after "1997," insert therefor -- and U.S. Patent Application No. 09/448,907, entitled "Packetized Command Interface To A Graphics Processor" of Zahid S. Hussain et al. Filed November 23, 1999. --.

Column 3,
Line 27, delete "exemplar" and insert therefor -- exemplary --.

Column 4,
Line 7, delete "1 10" and insert therefor -- 110 --.

Column 7,
Line 57, delete "may be" (first occurrence )

Column 9,
Line 37, delete "inventions" and insert therefor -- invention --.

Signed and Sealed this

Twenty-sixth Day of November, 2002

*Attest:*

*Attesting Officer*

JAMES E. ROGAN
*Director of the United States Patent and Trademark Office*